United States Patent
Wu

(10) Patent No.: US 9,461,531 B2
(45) Date of Patent: Oct. 4, 2016

(54) BRAKING DEVICE

(71) Applicant: J-Star Motor Industrial Co., Ltd, Taipei (TW)

(72) Inventor: Kuo-Cheng Wu, Pitou Township, Changhua County (TW)

(73) Assignee: J-STAR MOTOR INDUSTRIAL CO., LTD, Taipei (TW)

( * ) Notice: Subject to any disclaimer, the term of this patent is extended or adjusted under 35 U.S.C. 154(b) by 287 days.

(21) Appl. No.: 14/047,267

(22) Filed: Oct. 7, 2013

(65) Prior Publication Data

US 2015/0061435 A1 Mar. 5, 2015

(30) Foreign Application Priority Data

Aug. 30, 2013 (TW) .............................. 102131368 A

(51) Int. Cl.
*H02K 7/106* (2006.01)
*H02K 49/06* (2006.01)
*H02K 49/04* (2006.01)

(52) U.S. Cl.
CPC ............ *H02K 49/06* (2013.01); *H02K 49/043* (2013.01)

(58) Field of Classification Search
CPC .... H02K 21/22; H02K 21/222; H02K 49/06; H02K 49/043; H02K 7/02; H02K 2/227
USPC .............................. 310/74, 75 R, 76, 77, 153
See application file for complete search history.

(56) References Cited

U.S. PATENT DOCUMENTS

| 4,636,671 | A | * | 1/1987 | Terada | ..................... | F02P 1/00 123/601 |
|---|---|---|---|---|---|---|
| 6,084,325 | A | * | 7/2000 | Hsu | ..................... | A63B 21/0051 188/161 |
| RE38,464 | E | * | 3/2004 | Kusase | ..................... | H02K 3/28 310/180 |
| 2009/0174271 | A1 | * | 7/2009 | Lin | ..................... | H02K 1/146 310/153 |
| 2011/0084564 | A1 | * | 4/2011 | Huang | ..................... | H02K 1/17 310/154.12 |
| 2011/0227514 | A1 | * | 9/2011 | Lee | ..................... | H02K 49/043 318/376 |

* cited by examiner

*Primary Examiner* — Naishadh Desai
(74) *Attorney, Agent, or Firm* — Muncy, Geissler, Olds & Lowe, P.C.

(57) ABSTRACT

A braking device includes a flywheel rotatably mounted on a brace, a circular rotor deposited on the flywheel, and a stator fixed to the brace for combining with the rotor. The stator includes first and second magnetic poles. The first magnetic pole is larger than the second magnetic pole. The first and second magnetic poles are arranged into a ring in an interlaced manner. Each of the first and second magnetic poles has a coil. The braking device has a magnetic control unit mounted on a lateral of the brace near a rim of the flywheel and configured to generate magnetism in response to electric currents generated by the coils, so as to change a rotatory load of the flywheel. With the interlaced arrangement of the large and small magnetic poles, the braking device can have the rotor rotating with less cogging torque, and in turn reduced noise.

7 Claims, 8 Drawing Sheets

BRAKING DEVICE

BACKGROUND OF THE INVENTION

1. Technical Field

The present invention relates to braking devices, and more particularly to a braking device that generates less cogging torque and noise.

2. Description of Related Art

In a braking device, when the permanent magnet of its rotor moves with respective to the slot of its stator, the gap reluctance varies with the changing magnetic flux and magnetic energy in the magnetic circuit, and as a result vibration as well as noise can generate. As known in the art, the consequent noise and cogging torque have significantly adverse impact on the performance of the braking device.

A conventional braking device primarily comprises a flywheel, a substantially circular rotor that is set on one lateral of the flywheel, and a stator that is deposited in a central hole of the rotor. The stator has a core that is provided with a plurality of outward extending teeth. Each of the teeth has a coil wound therearound. FIG. 1 shows periodic variation of cogging torque in a conventional braking device. As can be seen clearly, the average cogging torque is about 86.8 mN-m. In other words, such a braking device when operating can generate significant cogging torque and in turn disturbing noise.

For minimizing cogging torque, sonic manufacturers use plural permanent magnets to form the rotor for braking devices with a plurality of magnetic poles provided by the rotor, and use plural round silicon steel sheets to form the stator, wherein these silicon steel sheets are stacked in a specific deflection angle and fastened as a whole. The stator is peripherally formed with a plurality of oblique slots for receiving coils. The rotor and the stator such configured can generate a deflecting magnetic field that serves to eliminate vibration and the noise caused by cogging torque generated during the braking device's operation. However, this existing approach makes the braking device structurally Complicated and thus requires more manufacturing costs.

Therefore, the conventional braking devices need to be improved.

SUMMARY OF THE INVENTION

The primary objective of the present invention is to provide a braking device that has reduced cogging torque and noise as compared to the conventional braking device.

To achieve the above and other objectives of the present invention, the disclosed braking device comprises a brace, a flywheel, a rotor, a stator and a magnetic control unit. Therein, the flywheel is a substantially round plate that has one concave surface and is rotatably mounted on the brace. The rotor has a rotatory shaft and at least one magnetic member. The rotatory shaft rotatably passes through a center of the flywheel. The at least one magnetic member is deposited on the concave surface of the flywheel and encircles the rotatory shaft. The stator is fixed to the brace for combining with the rotor. The stator includes a plurality of first magnetic poles and a plurality of second magnetic poles. The first and second magnetic poles are arranged into a ring in an interlaced manner. Each of the first and second magnetic poles has a coil. The first magnetic pole is larger than the second magnetic poles. The magnetic control unit is mounted on a lateral of the brace near a rim of the flywheel and is configured to generate magnetism in response to electric currents generated by the coils, so as to change a rotatory load of the flywheel.

Therein, the flywheel has its concave surface centrally provided with a positioning shaft that is formed with an axial hole for allowing the rotatory shaft to pass therethrough and rotate with respect to the flywheel.

Therein, the stator is formed from a plurality of silicon steel sheets that are stacked together. Each of the silicon steel sheets is centrally formed with a through hole for allowing the stator to be received between the positioning shaft and the at least one magnetic member.

Therein, each of the first and second magnetic poles has a body and a tooth, wherein the coil is wound around the body, and the tooth of each of the magnetic poles is separated from the at least one magnetic member by an interval.

Therein, the tooth of the first magnetic pole has an area facing the magnetic member larger than an area of the tooth of the second magnetic poles facing the magnetic member.

Therein, the concave surface of the flywheel is formed with an inner periphery. The at least one magnetic member has an outer wall and an killer wall. The outer wall is curved and fixed to the inner periphery of the flywheel.

Therein, the inner wall of the at least one magnetic member is curved.

There is further a rectifier that is electrically connected to the magnetic control unit and includes a Δ-connected three-phase circuit and a Y-connected three-phase circuit. The Δ-connected three-phase circuit and the Y-connected three-phase circuit independently rectify currents before being connected in parallel to each other, In virtue of the interlaced arrangement of the large and small magnetic poles, the disclosed braking device can have the rotor rotating with less cogging torque, and in turn reduced noise.

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives.

DETAILED DESCRIPTION OF THE INVENTION

For explaining the disclosed structure, its feature and effects in detail, a preferred embodiment is described below to be read with the accompanying drawings.

Figure 1:
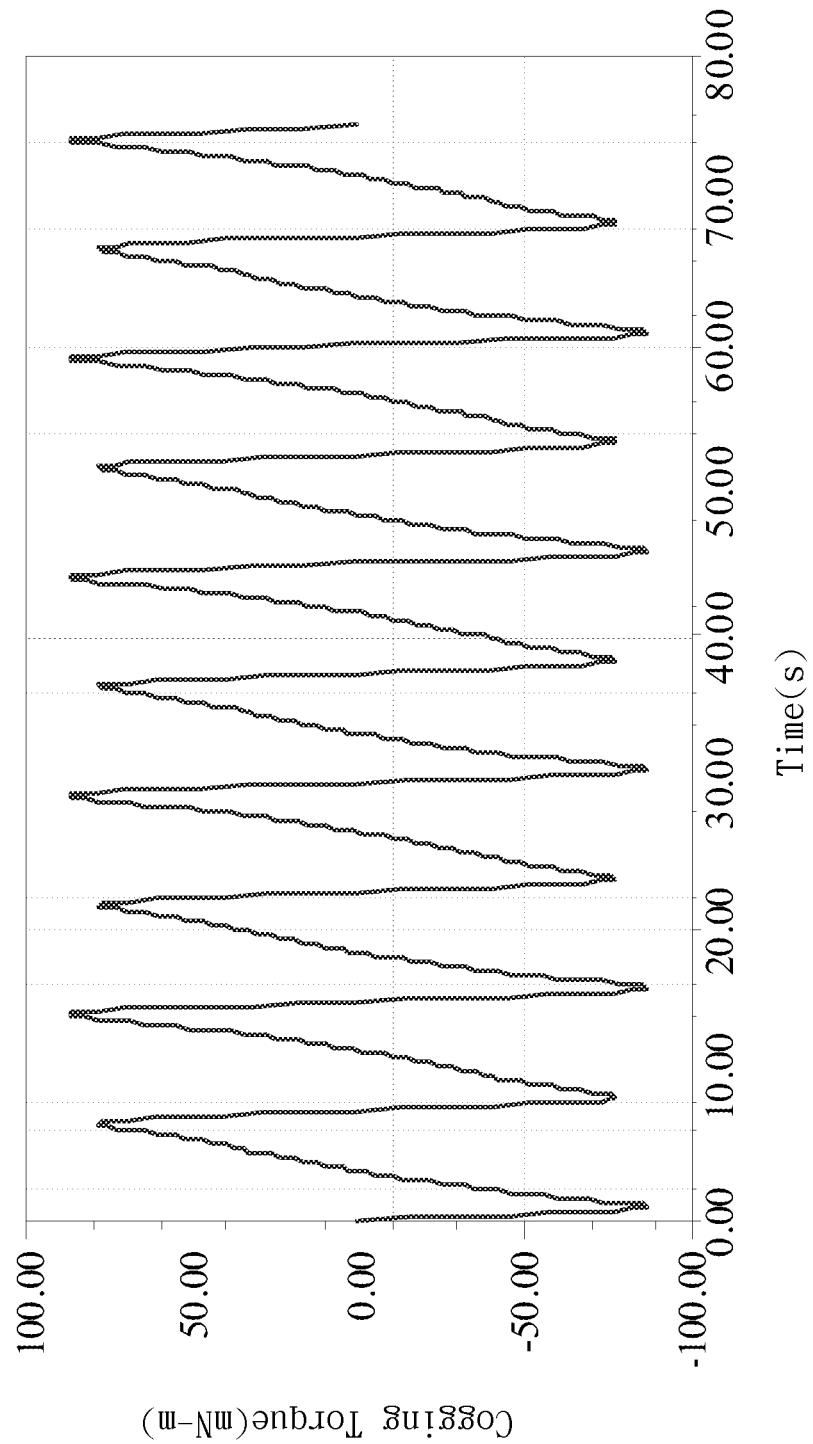
FIG. 1 is a circuit diagram of the braking device of a conventional braking device.
Figure 2:
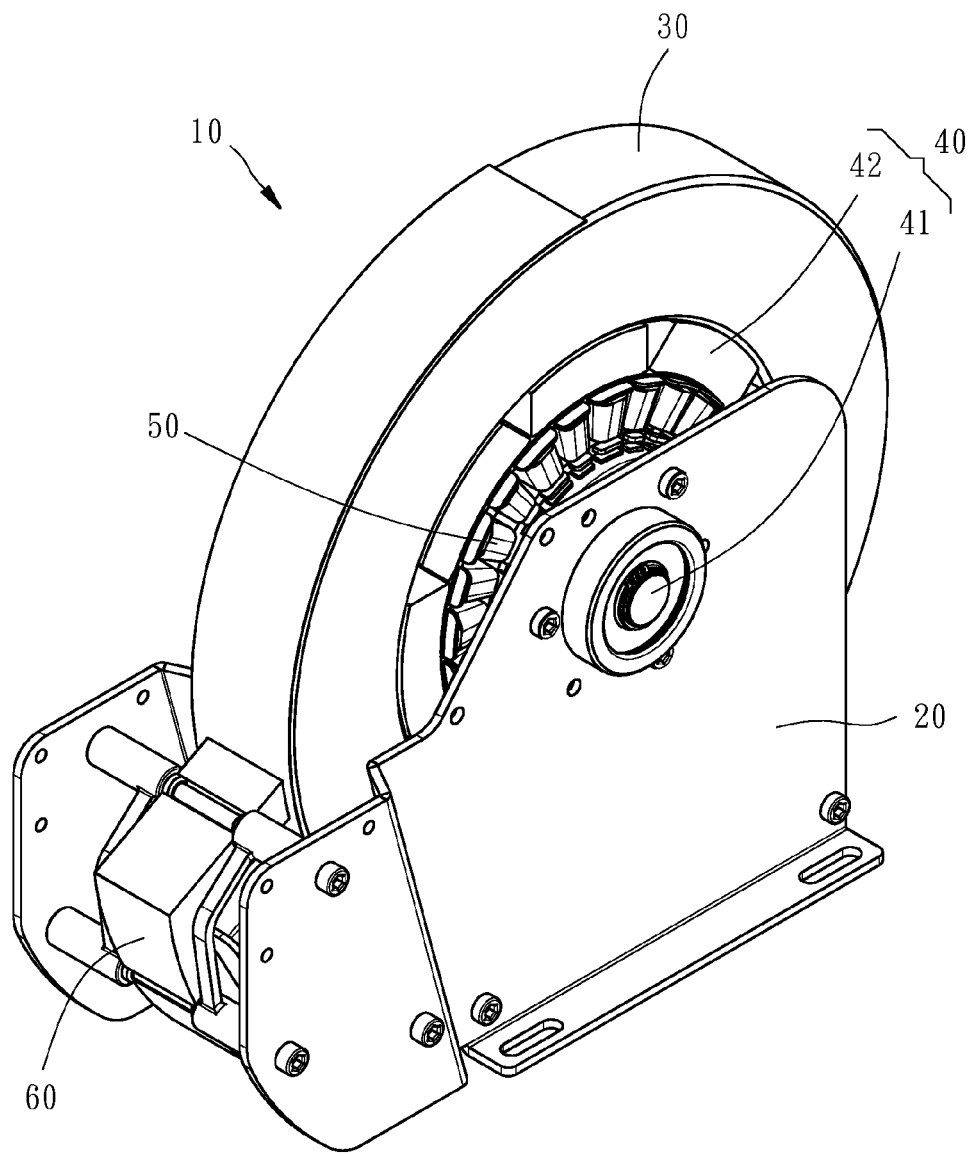
FIG. 2 is a perspective view of a braking device according to one preferred embodiment of the present invention.
Figure 3:
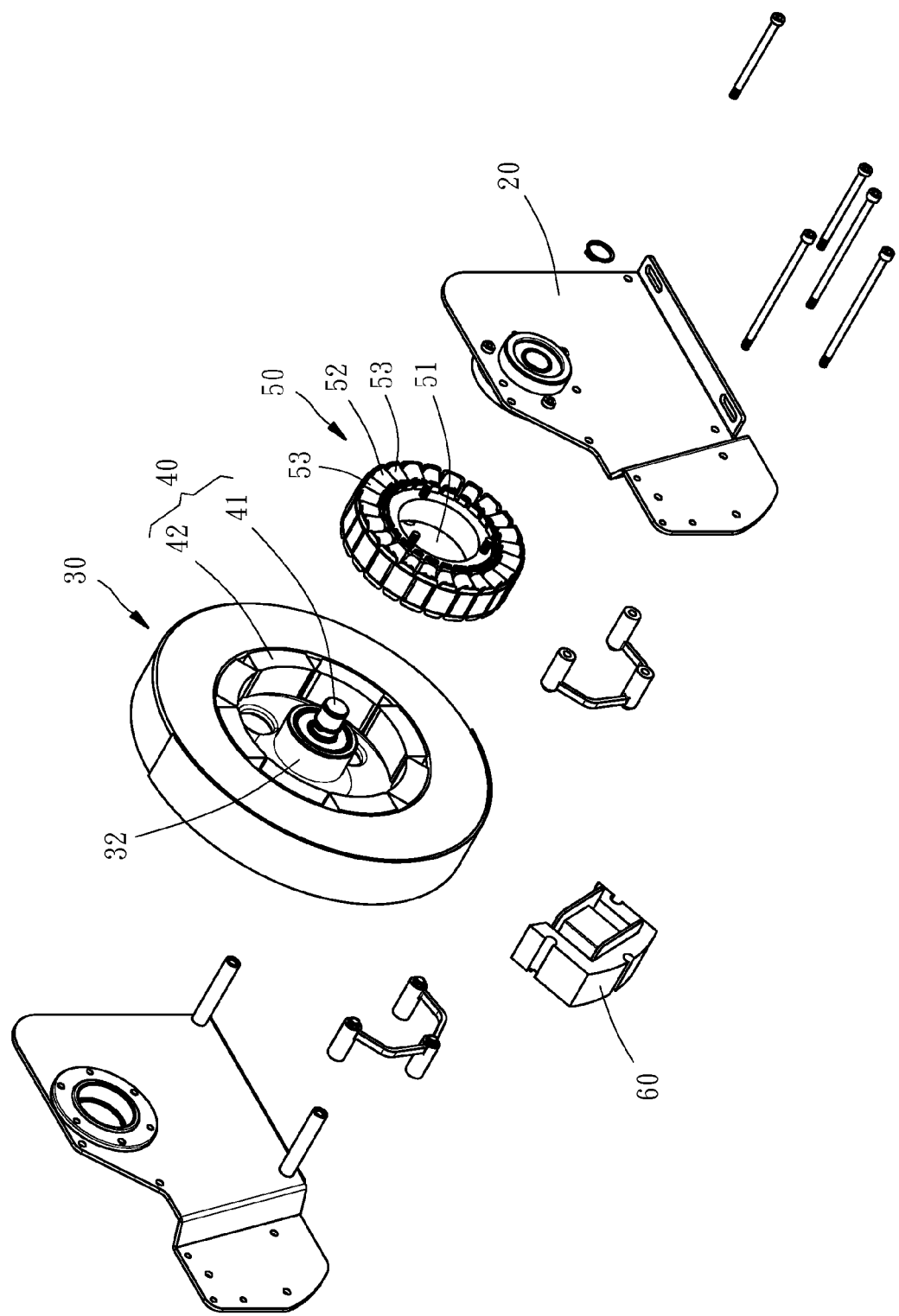
FIG. 3 is an exploded view of the braking device according to the preferred. embodiment of the present invention, showing the relative positions of the components.

Referring to FIG. 2 and FIG. 3, according to a first preferred embodiment of the present invention, a braking device 10 comprises:

a brace 20;

a flywheel 30, which is a substantially round plate having one concave surface, and rotatably mounted on the brace 20;

a rotor 40 having a rotatory shaft 41 and at least one magnetic member 42, wherein the rotatory shaft 41 rotatably passes through a center of the flywheel 30, and the at least one magnetic member 42 is deposited on the concave surface of the flywheel 30 and encircles the rotatory shaft 41;

a stator 50 fixed to the brace and sleeved on to the rotor 40, wherein the stator 50 includes a plurality of first magnetic poles 52 and a plurality of second magnetic poles 53, and the first and second magnetic poles 52, 53 are arranged into a ring in an interlaced manner, in which each of the first and second magnetic poles 52, 53 has a coil, and the first magnetic pole 52 is larger than the second magnetic poles 53; and a magnetic control unit 60, which is mounted on a lateral of the brace 20 near a rim of the flywheel 30 and is configured to generate magnetism in response to electric currents generated by the coils, so as to change a rotatory load of the flywheel 30.

Figure 4:
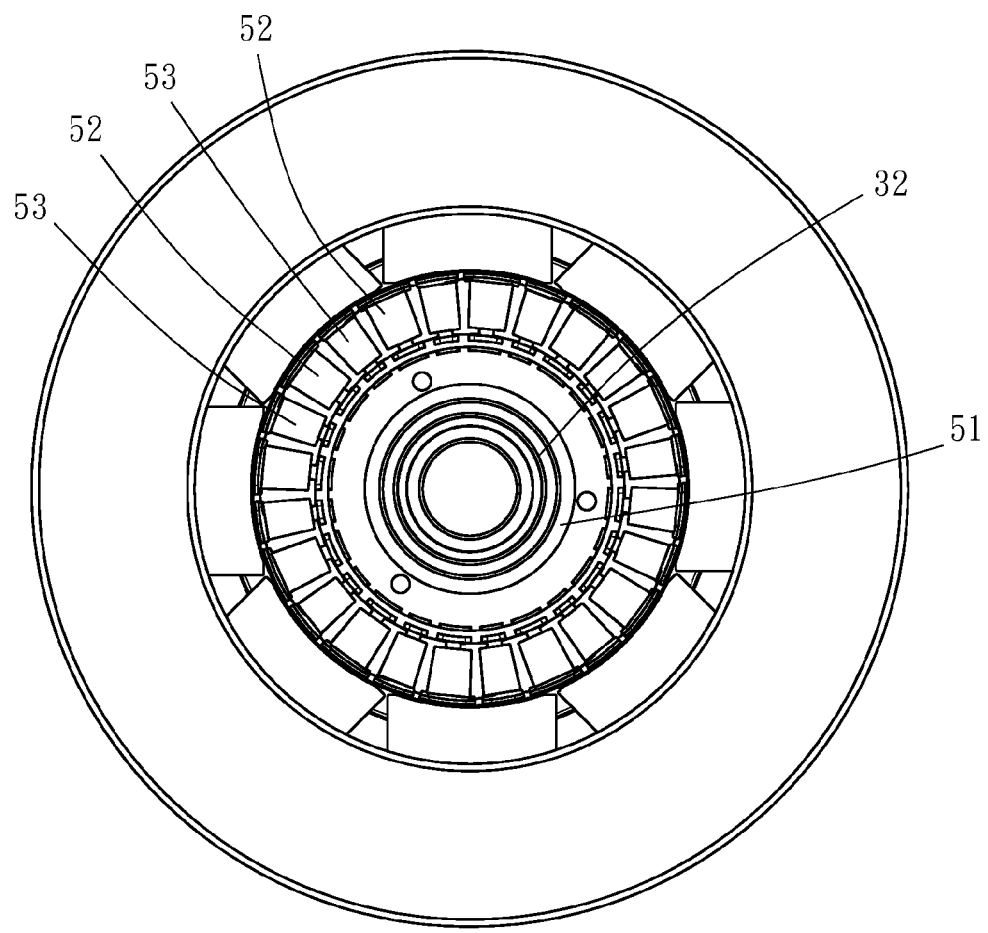
FIG. 4 is atop view of the braking device according to the preferred embodiment of the present invention, showing the relation between the flywheel, the stator and the rotor.
Figure 5:
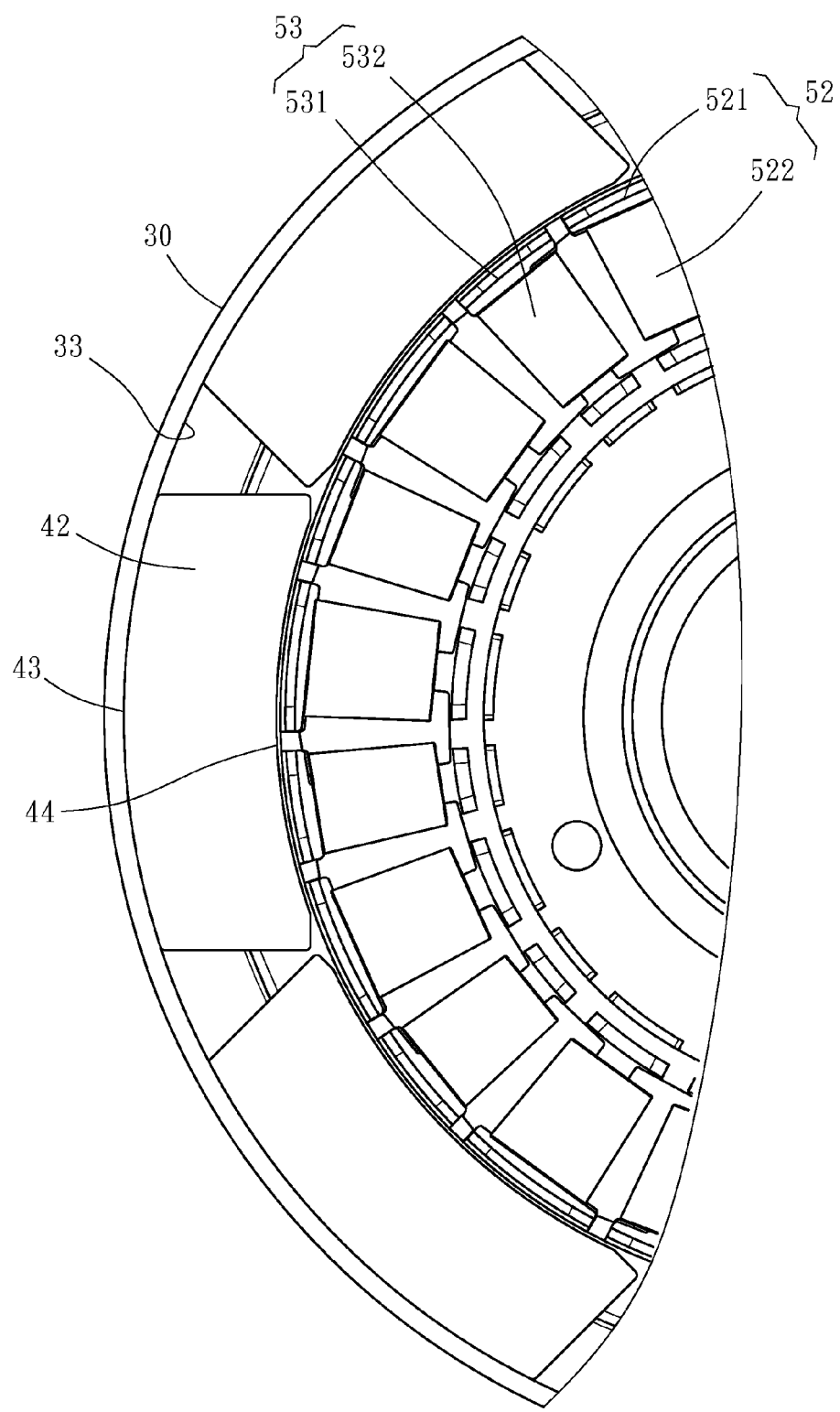
FIG. 5 is a partial, cross-sectional view of the braking device according to the preferred embodiment of the present invention, showing the details of the rotor and the stator.
Figure 6:
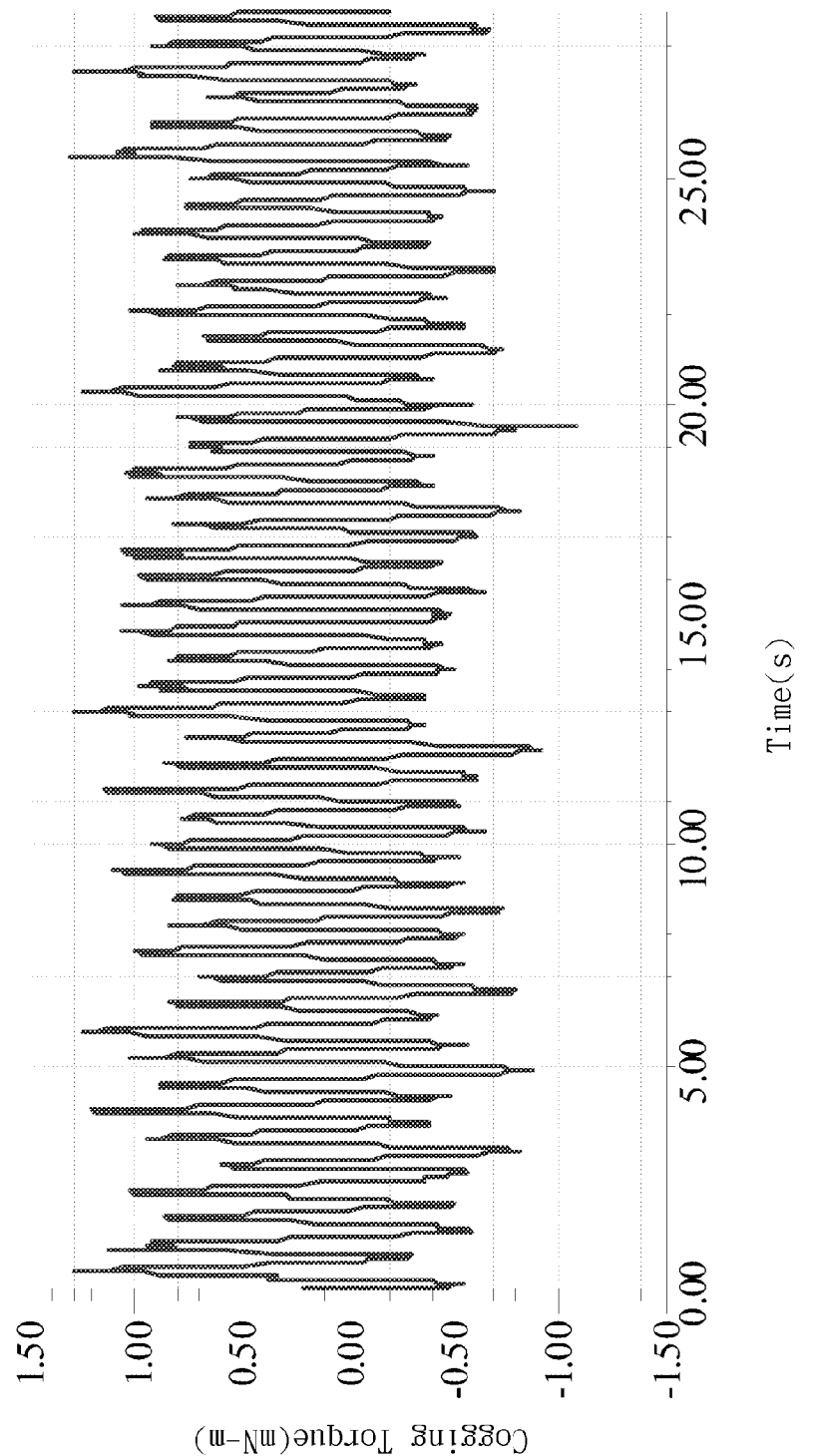
FIG. 6 is a waveform diagram of a cogging torque of the braking device according to the preferred embodiment of the present invention.
Figure 7:
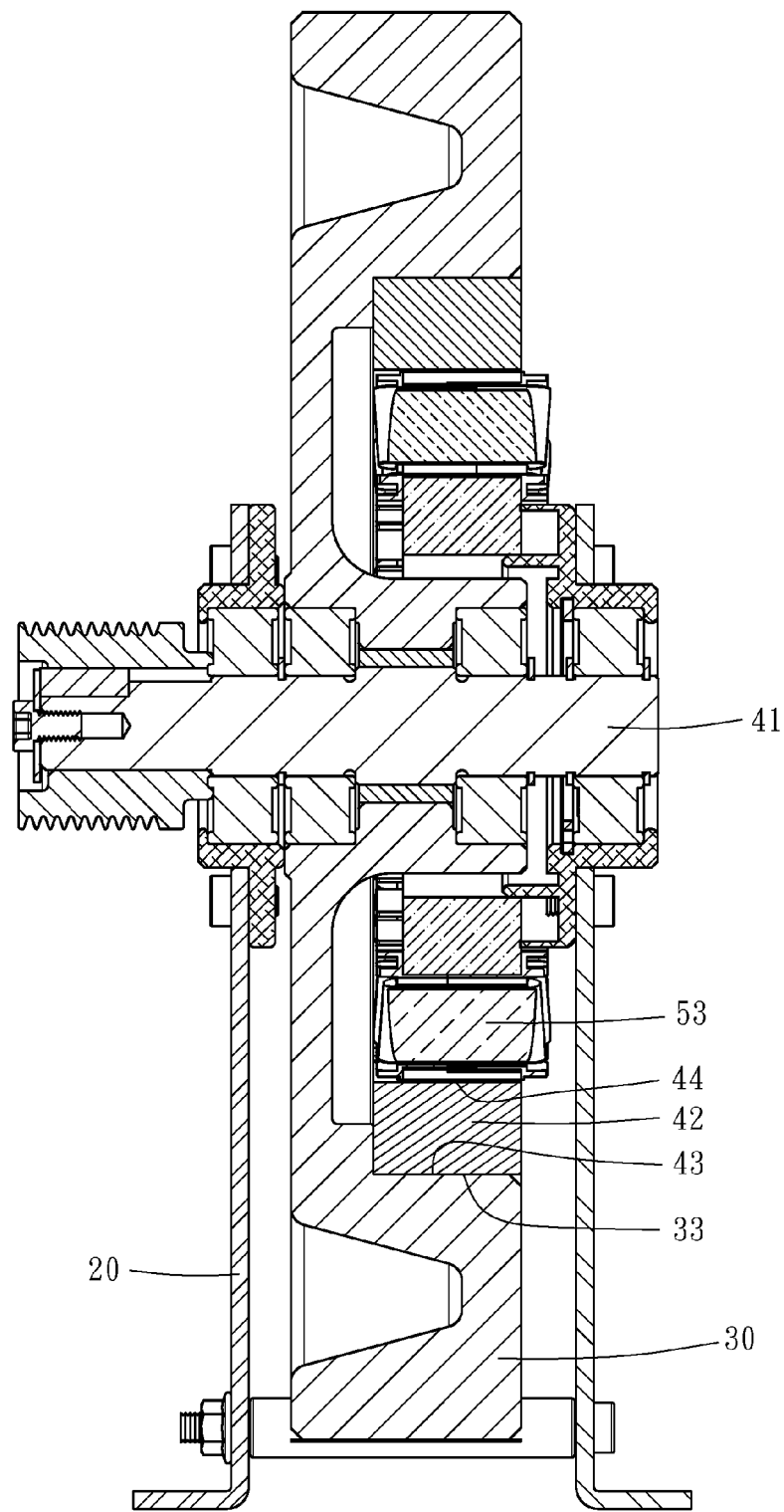
FIG. 7 is a cross-sectional view of the braking device according to the preferred embodiment of the present invention, showing the configuration of the components.

Now referring to FIG. 3 through FIG. 5 for further understanding the technical features of the present invention. As shown, the flywheel 30 at its concave surface has centrally a positioning shaft 32 provided with an axial hole 31 so that the rotatory shaft 41 can pass through the axial hole 31 and rotate with respect to the flywheel 30. The stator 50 is a stack of a plurality of silicon steel sheets. Each of the silicon steel sheets has centrally a through hole 51 for allowing the stator 50 to be received between the positioning shaft 32 and the at least one magnetic member 42. In one preferred embodiment of the present invention, the first magnetic poles 52 and the second magnetic poles 53 are provided in an amount of 12, respectively. Each of the first and second magnetic poles 52, 53 has a body 521 or 531 and a tooth 522 or 532. The coil is wound around the body 521 or 531. Each of the teeth 522, 532 of the magnetic poles is separated from the at least one magnetic member 42 by an interval. The tooth 522 of the first magnetic pole 52 has an area facing the magnetic ember 42 larger than an area of the tooth 532 of the second magnetic poles 53 facing the magnetic member 42. An inner periphery 33 is formed on the concave surface of the fly 30. The at least one magnetic member 42 has an outer wall 43 and an inner wall 44. The outer wall 43 is curved and fixed to the inner periphery 33 of the flywheel 30. Alternatively, the inner wall 44 of the at least one magnetic member 42 is also curved, an that the outer and inner walls 43, 44 of the at least one magnetic member 42 form a double-sided curve structure, which is helpful to save the use of silicon steel sheets, In addition, as shown in FIG. 6, a waveform diagram of a cogging torque, the average cogging torque of the disclosed braking device 10 is about 1.21 mN-m, which is much lower than that of the conventional braking device. Consequently, the operational noise generated can also be reduced.

Figure 8:
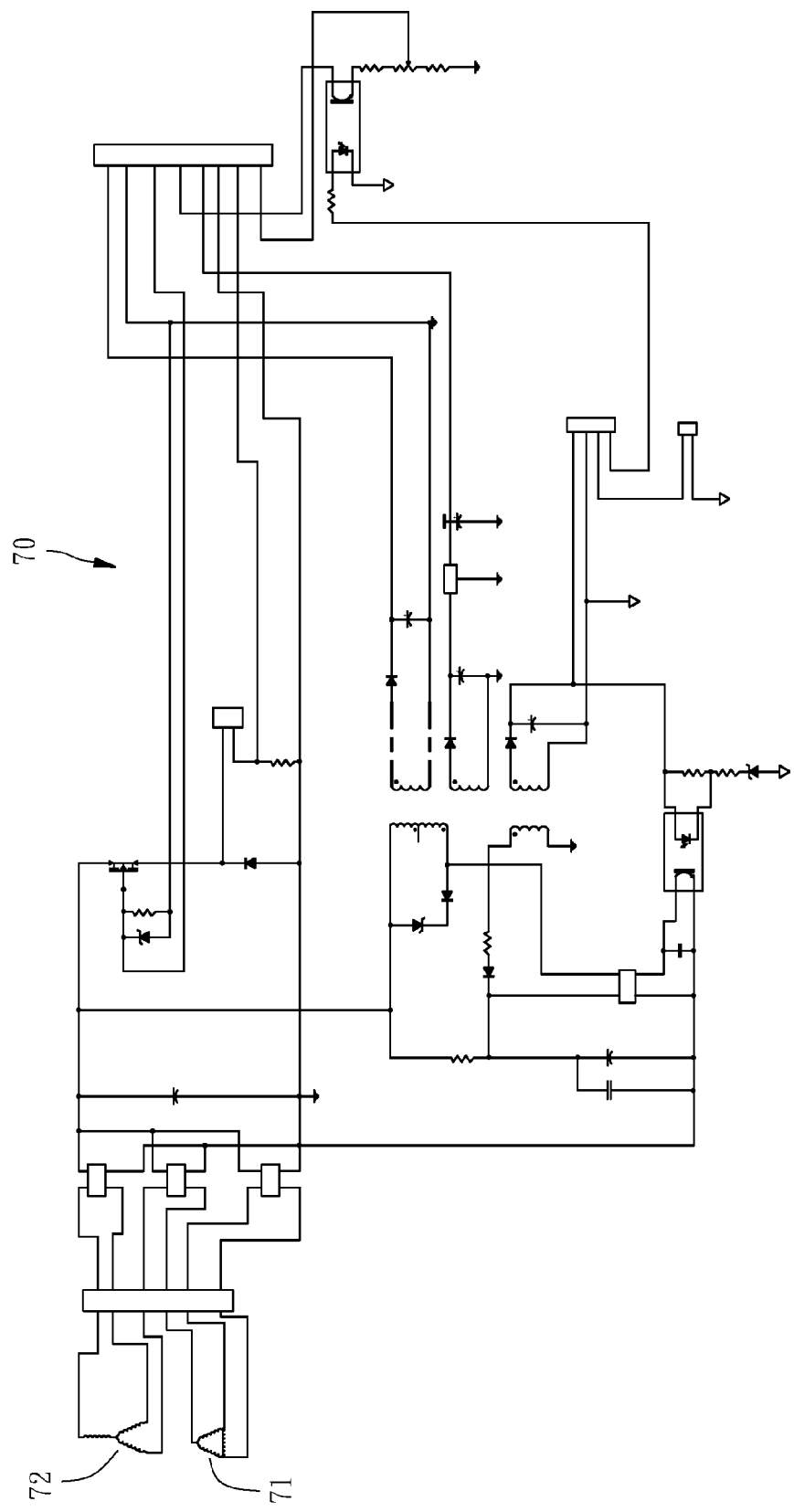
FIG. 8 is a circuit diagram of the braking device according to the preferred embodiment of the present invention.

Referring now to FIG. 8, the disclosed braking device 10 further comprises a rectifier 70. The rectifier 70 is electrically connected to the magnetic control unit 10 and includes a Δ-connected three-phase circuit 71 and a Y-connected three-phase circuit 72. The Δ-connected three-phase circuit 71 and the Y-connected three-phase circuit 72 independently rectify currents before being connected in parallel to each other. Thereby, the current hum caused by fifth order harmonics, seventh order harmonics and higher order harmonics can be eliminated to reduce current noise.

As a summary, in virtue of the interlaced arrangement of the large and small magnetic poles, the disclosed braking device 10 can have the rotor 40 rotating with less cogging torque, and in turn reduced noise. Moreover, due to the Δ-connected three-phase circuit 71 and the Y-connected three-phase circuit 72 of the rectifier 70 that rectify currents and then get connected in parallel to each other, the fifth-order and seventh-order harmonics generated during rectification for load conversion can be effectively eliminated, thereby reducing current noise.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A braking device, comprising:

a brace;

a flywheel, which is a substantially round plate having one concave surface and is rotatably mounted on the brace;

a rotor having a rotatory shaft and at least one magnetic member, the rotatory shaft rotatably passing through a center of the flywheel, and the at least one magnetic member being deposited on the concave surface of the flywheel and encircling the rotatory shaft;

a stator fixed to the brace and sleeved on to the rotor, and including a plurality of first magnetic poles and a plurality of second magnetic poles, the first and second magnetic poles being arranged into a ring in an interlaced manner, each of the first and second magnetic poles having a coil, and the first magnetic pole being larger than the second magnetic pole;

a magnetic control unit mounted on a lateral of the brace near a rim of the flywheel and is configured to generate magnetism in response to electric currents generated by the coils, so as to change a rotatory load of the flywheel; and a rectifier that is electrically connected to the magnetic control unit and includes a Δ-connected three-phase circuit and a Y-connected three-phase circuit, in which the Δ-connected three-phase circuit and the Y-connected three-phase circuit independently rectify currents before being connected in parallel to each other.

2. The braking device of claim 1, wherein the concave surface of the flywheel is centrally provided with a positioning shaft that has an axial hole for allowing the rotatory shaft to pass therethrough and rotate with respect to the flywheel.

3. The braking device of claim 2, wherein the stator is formed from a plurality of silicon steel sheets, in which the silicon steel sheets are stacked together and each has centrally a through hole for allowing the stator to be received between the positioning shaft and the at least one magnetic member.

4. The braking device of claim 1, wherein each of the first and second magnetic poles has a body and a tooth, in which the coil is wound around the body, and the tooth of each of the magnetic poles is separated from the at least one magnetic member by an interval.

5. The braking device of claim 4, wherein the tooth of the first magnetic pole has an area facing the magnetic member larger than an area of the tooth of the second magnetic poles facing the magnetic member.

6. The braking device of claim 1, wherein the concave surface of the flywheel is formed with an inner periphery, and the at least one magnetic member has an outer wall and an inner wall, in which the outer wall is curved and fixed to the inner periphery of the flywheel.

7. The braking device of claim 6, wherein the inner wall of the at least one magnetic member is curved.

* * * * *